(12) United States Patent
Wright et al.

(10) Patent No.: US 7,074,359 B2
(45) Date of Patent: *Jul. 11, 2006

(54) VIBRATORY MOLDING PROCESS AND PRODUCT

(75) Inventors: Donald K. Wright, Murphysboro, IL (US); Christopher L. Pemberton, Marion, IL (US); James Kendall Hankins, Harrisburg, IL (US)

(73) Assignee: Com-Pac International, Carbondale, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/430,247

(22) Filed: May 6, 2003

(65) Prior Publication Data

US 2004/0130050 A1    Jul. 8, 2004

Related U.S. Application Data

(63) Continuation-in-part of application No. 10/337,139, filed on Jan. 7, 2003.

(51) Int. Cl.
*B29C 43/34* (2006.01)

(52) U.S. Cl. .................. 264/443; 264/444; 264/445; 264/294; 264/296

(58) Field of Classification Search ............... 264/40.1
See application file for complete search history.

(56) References Cited

U.S. PATENT DOCUMENTS

| | | | |
|---|---|---|---|
| 3,410,745 A * | 11/1968 | Canepa | 156/554 |
| 3,723,225 A * | 3/1973 | Canepa | 156/554 |
| 3,932,257 A * | 1/1976 | Noguchi | 156/497 |
| 3,948,705 A | 4/1976 | Ausnit | |
| 3,999,255 A * | 12/1976 | Warburton et al. | 24/383 |
| 4,094,729 A * | 6/1978 | Boccia | 156/515 |
| 4,352,654 A | 10/1982 | Heimberger | |
| 4,555,282 A * | 11/1985 | Yano | 156/66 |
| 4,787,755 A | 11/1988 | Branson | |
| 4,892,512 A | 1/1990 | Branson | |
| 4,909,870 A * | 3/1990 | Gould et al. | 156/66 |
| 5,091,036 A * | 2/1992 | Taylor | 156/379.6 |
| 5,335,997 A * | 8/1994 | Kanemitsu et al. | 383/63 |

(Continued)

OTHER PUBLICATIONS

Dictionary Entries for "Matrix" and "Die" from Merriam-Webster Online Accessed Jul. 1, 2005.*

*Primary Examiner*—Michael P. Colaianni
*Assistant Examiner*—Monica A. Huson
(74) *Attorney, Agent, or Firm*—Vedder Price Kaufman & Kammholz

(57) ABSTRACT

A fastener strip is disclosed having permanently sealed, airtight portion and a reclosable portion capable of maintaining an airtight seal when closed. The permanently sealed portion is generally planar and essentially impervious to air flow. The reclosable portion includes a ridge and a trough, joined at their adjacent ends to a plug, which prevents air from leaking from the adjacent end of the reclosable portion. Additionally, a dam joins the plug to the first backing in an essentially airtight seal, and joins the plug to the second backing in an essentially airtight seal. A method and apparatus for sealing portions of a thermoplastic fastener strip are also disclosed. A method is additionally disclosed for vibrating and molding thermoplastic materials, in which a flow of malleable thermoplastic material is initiated and molded with an effectively dimensioned vibrator that is unitary, with a first matrix for guiding and molding the malleable polymer.

18 Claims, 11 Drawing Sheets

U.S. PATENT DOCUMENTS

| | | | |
|---|---|---|---|
| 5,405,561 A * | 4/1995 | Dais et al. | 264/40.1 |
| 5,827,163 A * | 10/1998 | Kettner | 493/211 |
| 6,063,224 A * | 5/2000 | Tomic et al. | 156/244.25 |
| 6,216,423 B1 | 4/2001 | Thieman | |
| 6,357,914 B1 | 3/2002 | Kinigakis et al. | |
| 6,499,272 B1 | 12/2002 | Thieman | |
| 6,562,165 B1 * | 5/2003 | Bauman et al. | 156/66 |
| 2002/0017078 A1 | 2/2002 | Thieman | |
| 2002/0023321 A1 | 2/2002 | Clune | |
| 2002/0037115 A1 | 3/2002 | Kinigakis et al. | |
| 2002/0152719 A1 | 10/2002 | Kinigakis et al. | |
| 2002/0152720 A1 | 10/2002 | Kinigakis et al. | |
| 2002/0152721 A1 | 10/2002 | Kinigakis et al. | |
| 2002/0154836 A1 | 10/2002 | Kinigakis et al. | |
| 2002/0178693 A1 | 12/2002 | Kinigakis et al. | |
| 2003/0050167 A1 | 3/2003 | Kinigakis et al. | |
| 2003/0074861 A1 | 4/2003 | Thieman | |

* cited by examiner

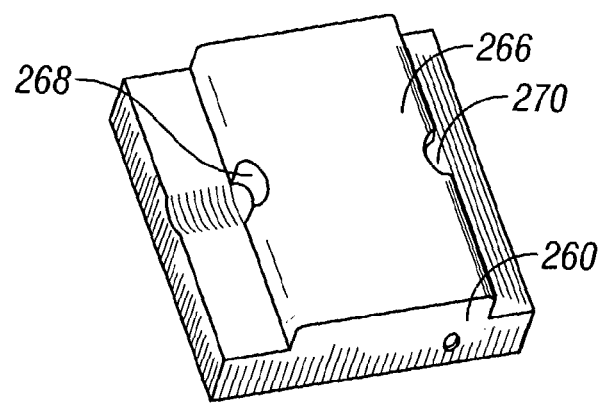
FIG. 12
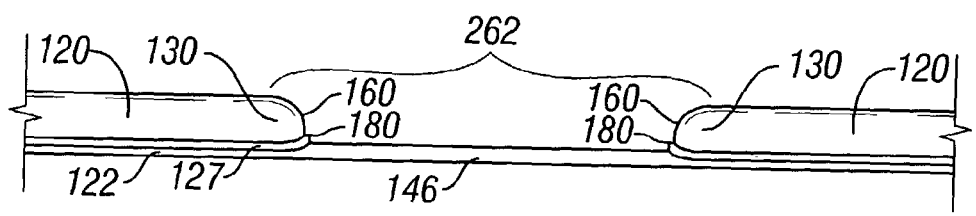
FIG. 13
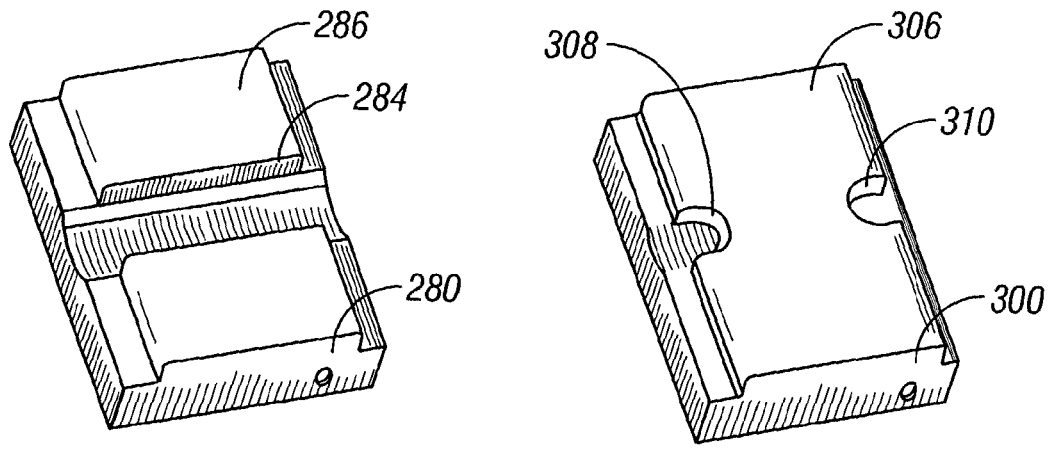
FIG. 14  FIG. 15

VIBRATORY MOLDING PROCESS AND PRODUCT

CROSS-REFERENCE TO RELATED APPLICATIONS

This application is a continuation-in-part of co-pending U.S. application Ser. No. 10/337,139, filed Jan. 7, 2003, incorporated herein in its entirely by reference.

FIELD OF THE INVENTION

The invention relates generally to a process for permanently sealing portions of reclosable fastener strips that includes the use of a vibrating horn to heat and mold the fastener strip. The invention also relates generally to an apparatus for permanently sealing portions of reclosable fastener strips and to reclosable fastener strips that include permanently sealed airtight portions, when sealed to a web of film for use in a reclosable bag.

BACKGROUND OF THE INVENTION

Reclosable fastener strips are widely used in the packaging industry as components for reclosable plastic bags, among other things. Typically, the fastener strips are manufactured in long, continuous lengths that are wound on reels or accordion-folded in boxes for storage and shipping.

These continuous lengths are usually subsequently cut to a size suitable for attaching to individual bags on, for example, a form and fill machine. The fastener strips are normally composed of thermoplastic materials, such as polyethylene, polypropylene, ethylene vinyl acetate, polyethylene terephthalate, polyvinylidene fluoride, acrylonitrile butadiene styrene or the like. For example, the fastener strips often include backings comprised of a polyethylene-ethylene vinyl acetate blend. The backings often include a profile portion having ridges and a trough composed of polyethylene terephthalate. A representative fastener strip of the prior art is depicted in FIGS. 17–19.

In order for the cut end of the fastener strip to seal against air leakage in or out of the reclosable bag, the end must be closed off in some manner. Also, the closed-off portion should be thinned and flattened to facilitate the cutting operation. Adhesives and thermal welds, notably "spot seals," have been utilized in the past. However, neither of these techniques is entirely reliable, and both of these techniques tend to deform or obstruct portions of the fastener strips that are intended to remain unaffected and, therefore, reclosable.

Vibratory welding processes, including sonic and ultrasonic processes also have been used in the manufacture of reclosable thermoplastic plastic bags, as well as other thermoplastic work pieces using known power supplies, transducers, boosters, and harmonically balanced horns. Conventional horns used in these processes are of several different types. These types include flat horns, knurled horns, and reverse-knurled horns. However, each one of these horns has two major drawbacks. One drawback is that these horns typically imprint an undesirable contour on vibrated regions of the thermoplastic work piece. The other drawback is that these horns often deform nearby unvibrated portions of the thermoplastic work piece. For example, previously disclosed horns typically deform thermoplastic fastener strips in reclosable portions that adjoin the vibrated region. This deformation creates gaps that prevent the fastener strips from forming an airtight seal.

Ultrasonic processes are also employed to reduce the thickness of thermoplastic fastener strips to facilitate cutting and sealing the thermoplastic fastener strips and associated bags. These previously disclosed processes cannot be relied upon to create an airtight seal, because the prior art ultrasonic horns typically (a) imprint an undesirable contour on vibrated regions of the bag so as to create leaks, and (b) deform nearby unvibrated portions of the thermoplastic work piece.

Therefore, a need exists for a new process for permanently sealing portions of reclosable thermoplastic fastener strips. Desirably, the new process provides an airtight seal in both the vibrated and unvibrated portions of the fastener strip.

SUMMARY OF THE INVENTION

The present invention provides a fastener strip having a permanently sealed, airtight portion and a reclosable portion capable of maintaining an airtight seal when closed. The permanently sealed portion is generally planar and essentially impervious to air flow. The reclosable portion includes a ridge and a trough joined at their adjacent ends to a plug, which prevents air from leaking from the adjacent end of the reclosable portion. Additionally, a dam joins the plug to a first backing in an essentially airtight seal, and joins the plug to a second backing in an essentially airtight seal.

The invention also provides a method for sealing portions of a thermoplastic fastener strip. The method includes vibrating a portion of a conventional, thermoplastic fastener strip, which is capable of maintaining an airtight seal, so as to produce a malleable portion. A first matrix is pressed against the malleable portion to produce a first shape, and a second matrix is pressed against the malleable portion to produce a second shape for permanently sealing a portion of the fastener strip. Preferably, a dual-purpose vibrator/matrix is utilized to vibrate the fastener strip and produce the first shape. In addition, the first and second shapes are also enhanced by other matrices at separate stages.

Pressing the malleable portion to produce the first shape may include flattening the malleable portion and displacing at least some of the malleable portion to produce an essentially airtight plug. The plug joins the planar portion in an essentially airtight seal and joins the adjacent end of the reclosable portion in an essentially airtight seal.

Pressing the malleable portion to produce the second shape may include further flattening the malleable portion and displacing at least some of the malleable portion to produce an essentially airtight dam. The dam joins the plug to a first backing of the reclosable portion in an airtight seal and, also, joins the plug to a second backing of the reclosable portion.

The invention also provides an apparatus for sealing portions of a fastener strip. The apparatus includes a vibrator for vibrating a portion of the fastener strip so as to increase the malleability of the portion, a first matrix constructed and arranged for pressing against the malleable portion to produce a first shape for sealing the fastener; and a second matrix constructed and arranged for pressing against the malleable portion to produce a second shape for sealing the fastener.

In a broader aspect, the invention is an ultrasonic polymer-forming process for thermoplastic materials in which the improvement includes guiding the flow of malleable polymer to a predetermined location with an effectively dimensioned vibrator that is unitary with a first matrix for guiding and molding the malleable polymer. For example, the predetermined location may be a location in which additional polymer is desired to render the area stronger or more aesthetically pleasing, or to fill any gaps.

BRIEF DESCRIPTION OF THE DRAWINGS

FIG. 12 is a perspective view of a die for the second stage of the present invention;

FIG. 13 is an elevation of a second shape, which is produced by the second stage;

FIG. 14 is a perspective view of a die for the third stage of the present invention;

FIG. 15 is a perspective view of a die for the fourth stage of the present invention;

DETAILED DESCRIPTION OF THE INVENTION

Figure 1:
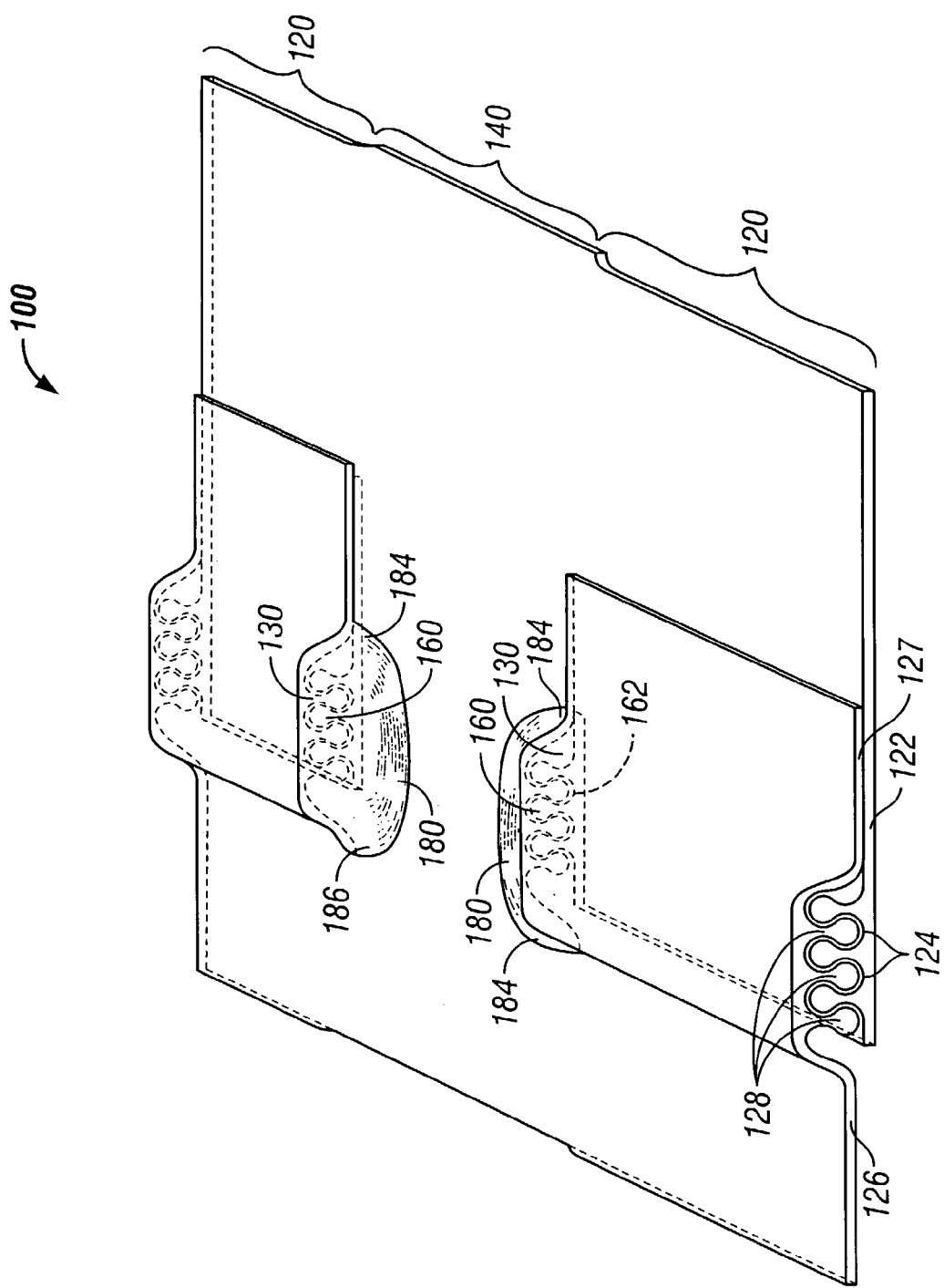
FIG. 1 is a truncated perspective view of a fastener strip of the present invention.

In a preferred embodiment, the invention includes a fastener strip such as fastener strip 100 depicted in FIG. 1. Fastener strip 100 includes at least one reclosable portion 120 and at least one permanently sealed, generally planar portion 140. Although the perspective view shown in FIG. 1 is necessarily truncated, due to space limitations, it is contemplated that fastener strip 100 may be wound on a reel or accordion-folded in a box for convenient shipping and storage and include hundreds or even thousands of reclosable portions 120 and generally planar portions 140.

Reclosable portion 120 includes first backing 122 and troughs 124, which typically extends lengthwise along fastener strip 100. Reclosable portion 120 also includes second backing 126 and ridges 128 for mating with troughs 124 in an airtight, reclosable seal that essentially prevents air flow from one side of the seal to the other. Flap or flange 127 conveniently extends from second backing 126 to an exterior side of fastener strip 100 in order to protect trough 124 and ridge 128 fron damage and to facilitate a user's grip for opening fastener strip 100.

The relative positions of troughs 124 and ridges 128 as depicted in FIG. 1 are arbitrary and need not be as shown for to invention to succeed. Also, either first backing 122 or second backing 126 may be positioned on the exterior side of fastener strip 100 and either of the backings 122, 126 may extend in the form of a flange, such as flange 127. The thicknesses of backings 122, 124 are often in the range of about 10 to 20 thousandths of an inch and the heights of trough 124 and ridge 128 are often in the range of about 50 to 100 thousandths of an inch. The inventiom however, is not limited to these ranges.

Commonly, the thickness of planar portion 140 is about the thickness of one of the backings 122, 126 to about the combined thickness of both of the backings. Planar portion 140 is essentially free of mating ridges and troughs, such as trough 124 and ridge 128, and includes essentially no void spaces.

Plug 160 joins troughs 124 and ridges 128 in an airtight seal at adjacent end 130 of reclosable portion 120. Troughs 124 and ridges 128 define longitudinal interstitial voids (best seen in FIG. 3) that communicate hydraulically lengthwise along reclosable portion 120. Even if troughs 124 and ridges 128 mate effectively so as to prevent air flow between them from one side of fastener 100 to the other (for example, from the interior side of fastener strip 100 to the exterior of fastener strip 100), the ends of trough 124 and ridge 128 must be sealed to prevent air from flowing longitudinally through these voids and passing through end 130. Plug 160 provides this seal.

Dam 180 joins plug 160 to first backing 122 and to second backing 126 as depicted in FIG. 1. Dam 180 is essentially impervious to air flow and forms airtight seals where it meets plug 160, first backing 122 and second backing 126, respectively. A primary purpose of dam 160 is to prevent air on one side of fastener strip 100 from leaking around plug 160 to the other side of fastener strip 100.

Figure 2:
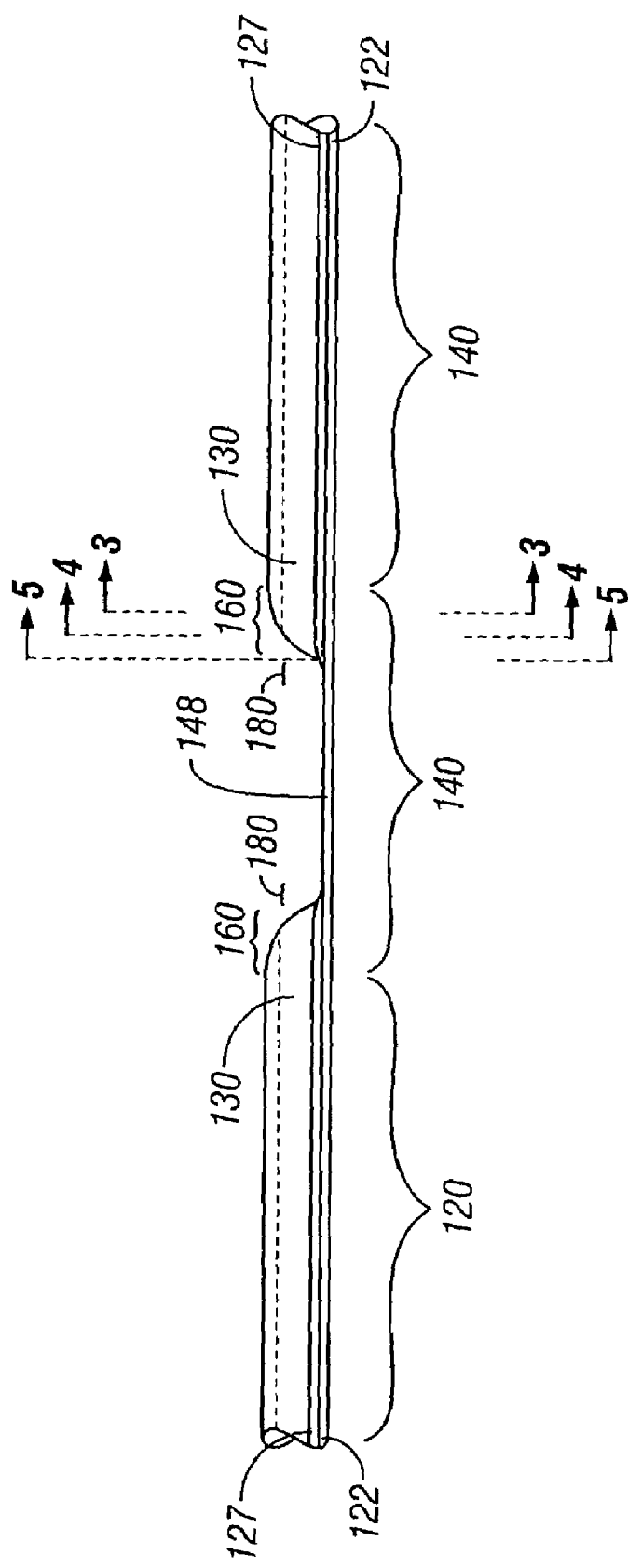
FIG. 2 is an elevation view of the fastener strip depicted in FIG. 1.

The relationship of plug 160 to dam 180 is best seen in FIG. 2. FIG. 2 shows how plug 160 seals end 130 of reclosable portion 120 to prevent longitudinal interstitial voids from passing air through end 130. Dam 180 joins and seals the backings 122, 126 with plug 160 and planar portion 140. Lines 3—3, 4—4 and 5—5 correspond to cross-sections depicted in FIGS. 3–5.

Figure 3:
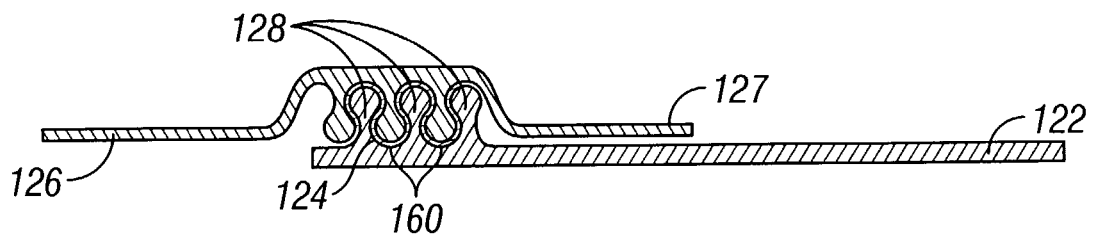
FIG. 3 is a cross-section taken along line 3—3 of FIG. 2.

Inspection of FIGS. 1–3 indicate that line 3—3 of FIG. 2 is at or near end 130. As can be seen in FIG. 3, trough 124 and ridge 128 define interstitial voids that are sealed by plug 160. The view in FIG. 3 looks away from planar portion 140 and toward reclosable portion 120. Longitudinal interstitial voids can be seen in cross-section, with plug 160 filling the voids. Significantly, FIG. 3 shows that trough 124 and ridge 128 are not significantly deformed at line 3—3 and, therefore, are capable of creating an airtight, reclosable seal across fastener strip 100. FIG. 3 is representative of reclosable portion 120, except that plug 160 covers over and/or infiltrates the interstitial voids.

Figure 4:
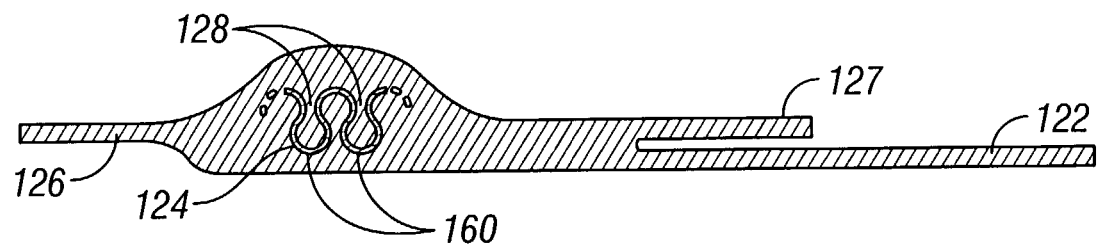
FIG. 4 is a cross-section taken along line 4—4 of FIG. 2.

The view in FIG. 4 is in the same direction as that of FIG. 3, but from a position closer to planar portion 140. Only vestiges of trough 124 and ridge 128 are apparent, and these are essentially filled by plug 160. FIG. 4 is representative of plug 160, except that the vestiges are present.

Figure 5:
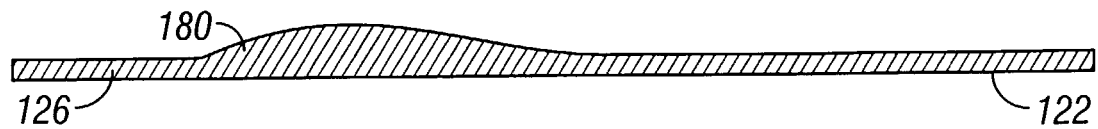
FIG. 5 is a cross-section taken along line 5—5 of FIG. 2.

FIG. 5 shows a relatively flattened and homogeneous cross-section, as compared to FIGS. 3 and 4. No vestiges of trough 124 and ridge 128 are visible. FIG. 5 represents the juncture of dam 180 with planar portion 140.

Figure 17:
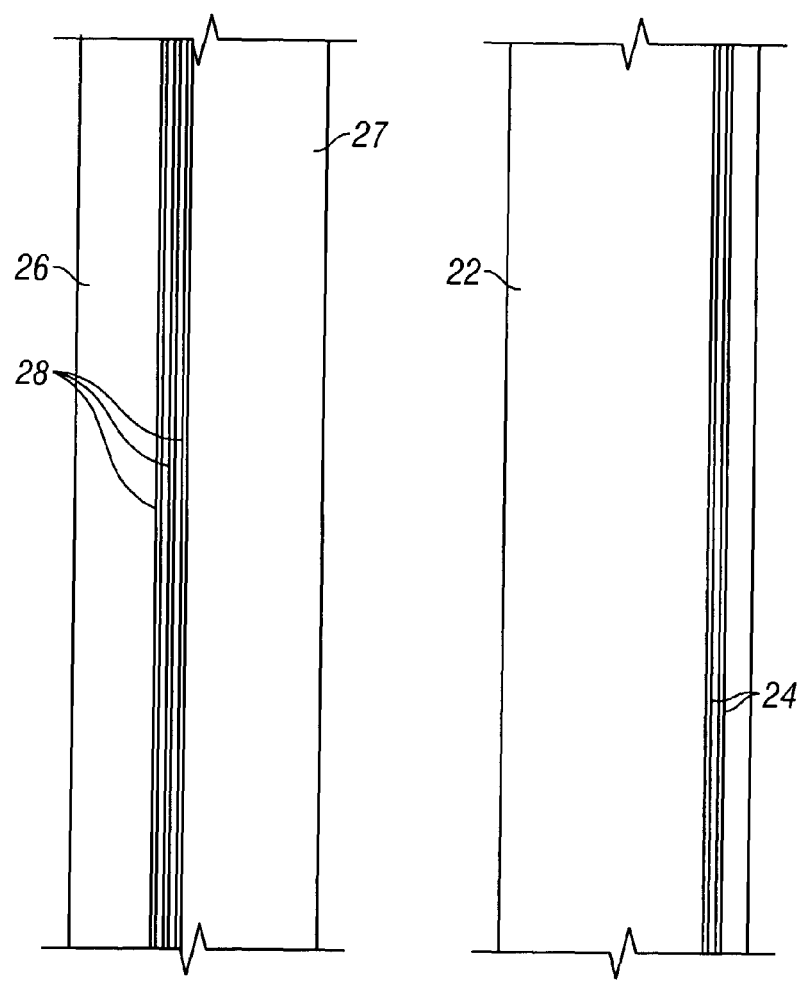
FIG. 17 is a plan view of a prior art fastener strip, including two backings.
Figure 18:
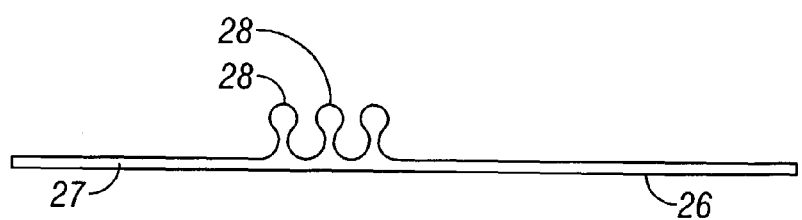
FIG. 18 is an elevation view of one of the prior art backings depicted in FIG. 15.
Figure 19:
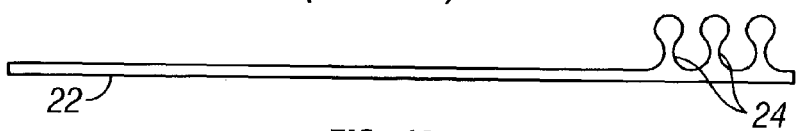
FIG. 19 is an elevation view of the other of the prior art backings depicted in FIG. 15.

Turning now to FIGS. 17–19, prior art fastener strip 10 includes first backing 22, having a plurality of longitudinal troughs 24 thereon, and second backing 126, which has a plurality of longitudinal ridges 28 and flap or flange 27. At least one of the troughs 24 reclosably mates with one of the ridges 28 to produce an essentially airtight seal that prevents air leakage between interior and the exterior sides of fastener strip 10.

Longitudinal interstitial voids commonly exist between trough 24 and ridge 28. While the voids do not necessarily interfere with the airtight seal between the sides of fastener strip 10, the voids permit air flow longitudinally along trough 24 and ridge 28. Fastener strip 10 is composed of a material that becomes progressively more fluid with increasing temperature, hereinafter referred to as a "thermoplastic" material.

Figure 6:
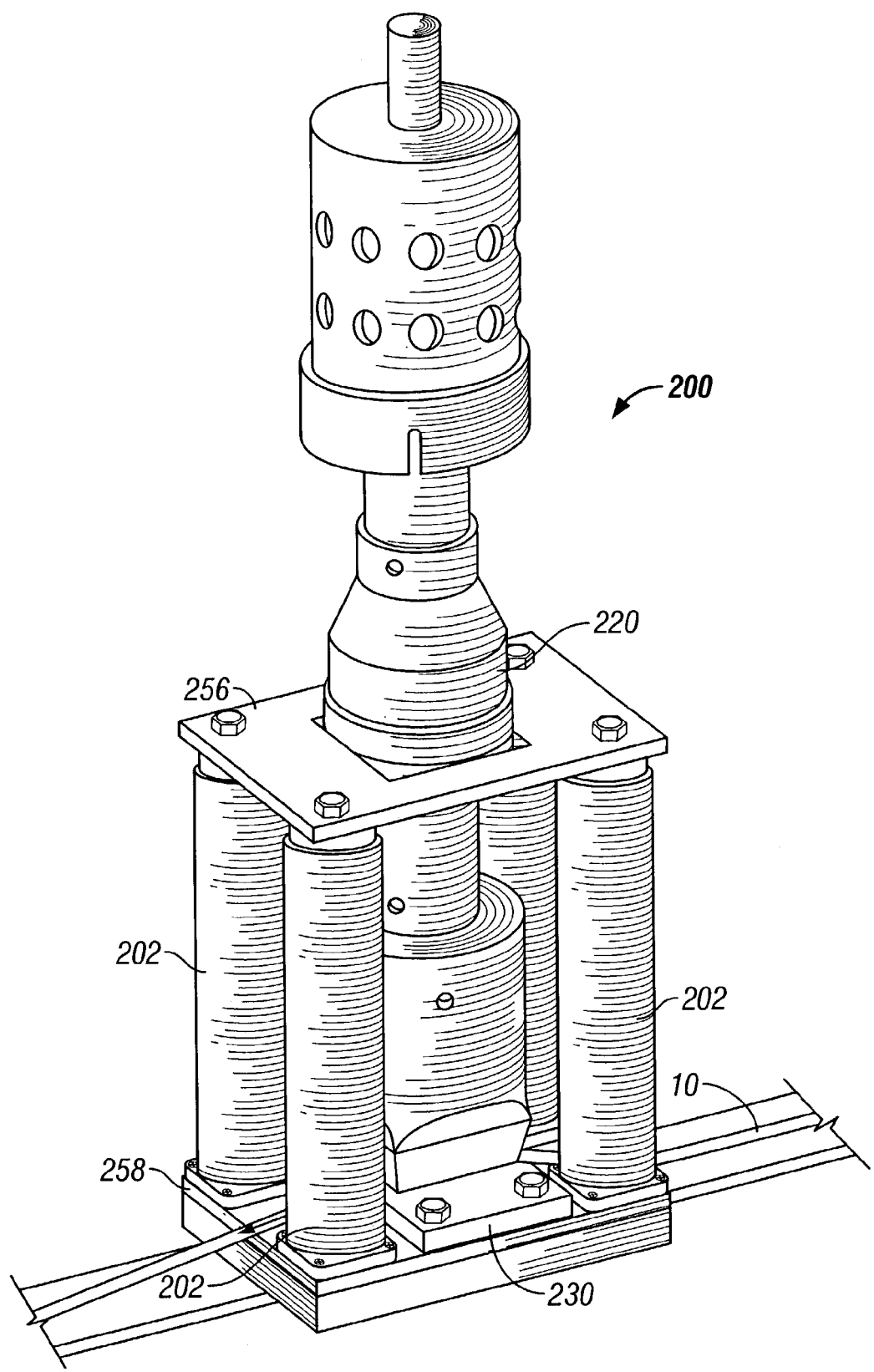
FIG. 6 is a perspective view of a first stage of an apparatus of the present invention.

FIG. 6 depicts first stage 256 of apparatus 200 of the present invention for sealing portions of a prior art fastener strip, such as thermoplastic fastener strip 10 shown in FIGS. 17–19. First stage 256 of apparatus 200 includes vibrator 220 for vibrating a portion of fastener strip 10 to produce a relatively more malleable portion 212, best seen in FIG. 9. FIG. 6 also shows anvil 230, which supports fastener strip 100 from below during the vibrating, and four pneumatic piston and cylinder assemblies 202. The use of four pneumatic pistons 202 assures that the anvil 230 is properly aligned and level, and also helps direct more of the energy from vibrator 220 to the fastener strip, rather than causing the anvil 230 to vibrate. First stage 256 is positioned at location 258, which is a short distance away from second stage 276, third stage 296, fourth stage 316 and fifth stage 320 (best seen in FIG. 11) of apparatus 200.

Figure 7:
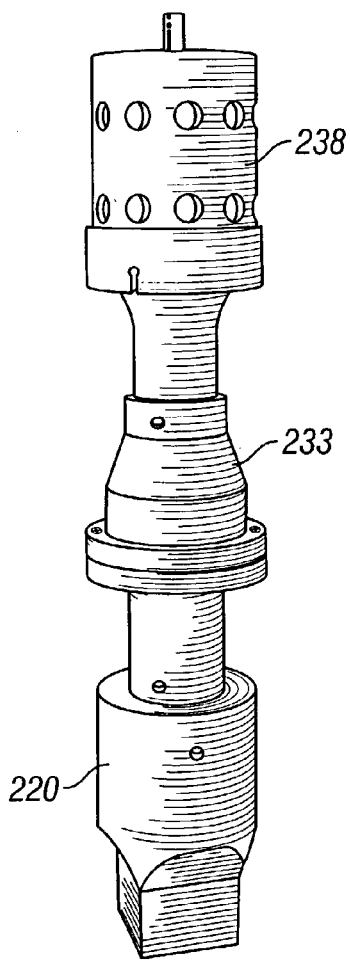
FIG. 7 is a perspective view of a vibrator of the present invention.

Vibrator 220, illustrated in FIG. 7, includes pneumatic actuator 231, ultrasonic horn or resonator 233 and first matrix 240. Actuator 231 receives compressed air and provides energy to vibrator 220 in the form of mechanical vibrations in the range of about 10,000 to about 100,000 cycles per second, more preferably at least about 20,000 cycles per second. Horn or resonator 233 focuses and intensifies the vibrations at first matrix 240, which is a single, integral unit with horn 233.

Horn 233 is also known as a solid resonator, a concentrator, or a mechanical amplifier. Horn 233 is dimensioned to be resonant at a predetermined frequency of vibration. When horn 233 is energized at its proximal input surface by an actuator 231, it provides ultrasonic energy (vibrations) at its opposite distal end to a workpiece that is in forced contact with the distal end.

Figure 8:
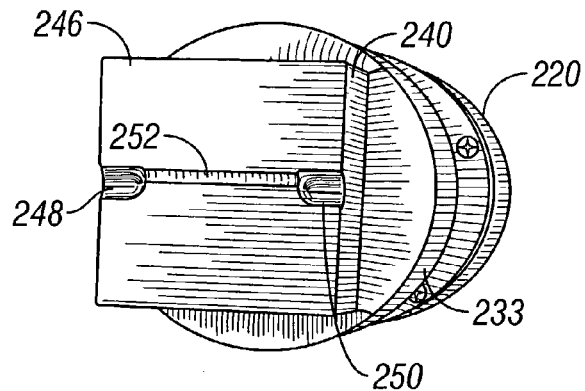
FIG. 8 is an end view of the vibrator depicted in FIG. 7.
Figure 9:
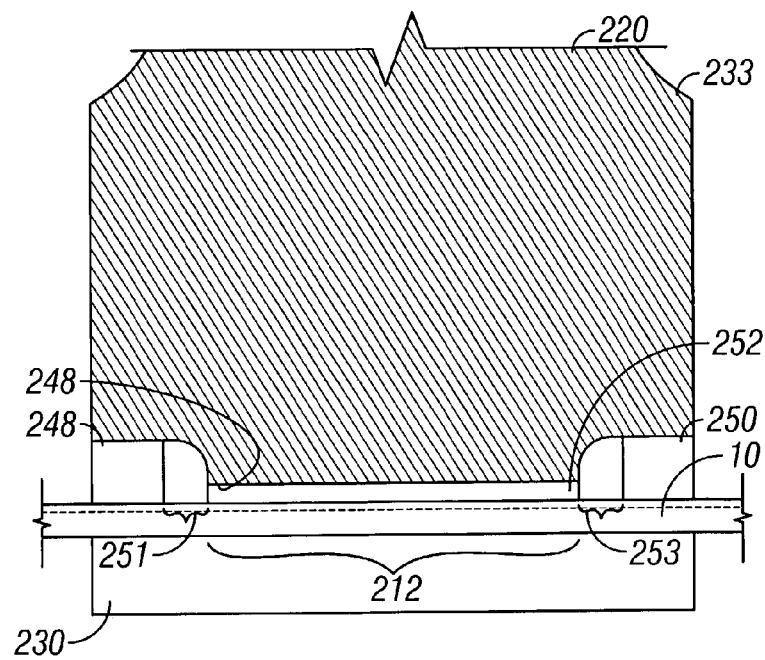
FIG. 9 is a partial cross-section of the vibrator taken along line 9—9 of FIG. 8.

As depicted in FIGS. 7–9, first matrix 240 is the distal end of horn 233. Alternatively, first matrix 240 can be constructed as a separate die and securely mounted on the distal end of horn 233. It is believed that fashioning first matrix 240 integrally with horn 23, rather than as a separate die mounted on horn 233, tends to promotes efficient and reproducible transmission of the vibrations. In either case, first matrix 240 is located at the distal end of horn 233 and can be utilized to press and mold a thermoplastic substrate, such as fastener strip 10, while vibrator 220 is vibrating.

Details of first matrix 240 are presented in FIG. 8. First matrix 240 includes a planar face 246 having cutouts 248, 250. Groove 252 of approximately semicircular cross-section extends across face 246 from cutout 248 to cutout 250. FIG. 8 illustrates that groove 252 is generally linear along the longitudinal axis of fastener strip 100 and that cutouts 248, 250 are each generally symmetrical and aligned along a shared axis of symmetry. The groove axis and the cutout axis are offset and generally parallel to each other. During use, the groove axis is aligned with and positioned directly over trough 24 and ridge 28.

FIG. 9 is a partial cross-sectional view taken along the groove axis of FIG. 8. It is evident from FIG. 9 that horn 233 is unitary with matrix 240. Cutouts 248 and 250 each include a transition volume 251, 253 having a depth that increases as distance from groove 252 increases. Each cutout 248, 250 has an arcuate cross-section, with the arcs positioned convexly to each other.

During use, first matrix 240 is placed over fastener strip 100, with groove axis 252, trough 24 and ridge 28 generally aligned. Moveable anvil 230 includes a generally planar face 23 that supports fastener strip 100 from below. Alternatively, fastener strip 100 may be placed between two vibrators 220 (not shown) for vibrating and pressing between two first matrices 240 (not shown).

Figure 16:
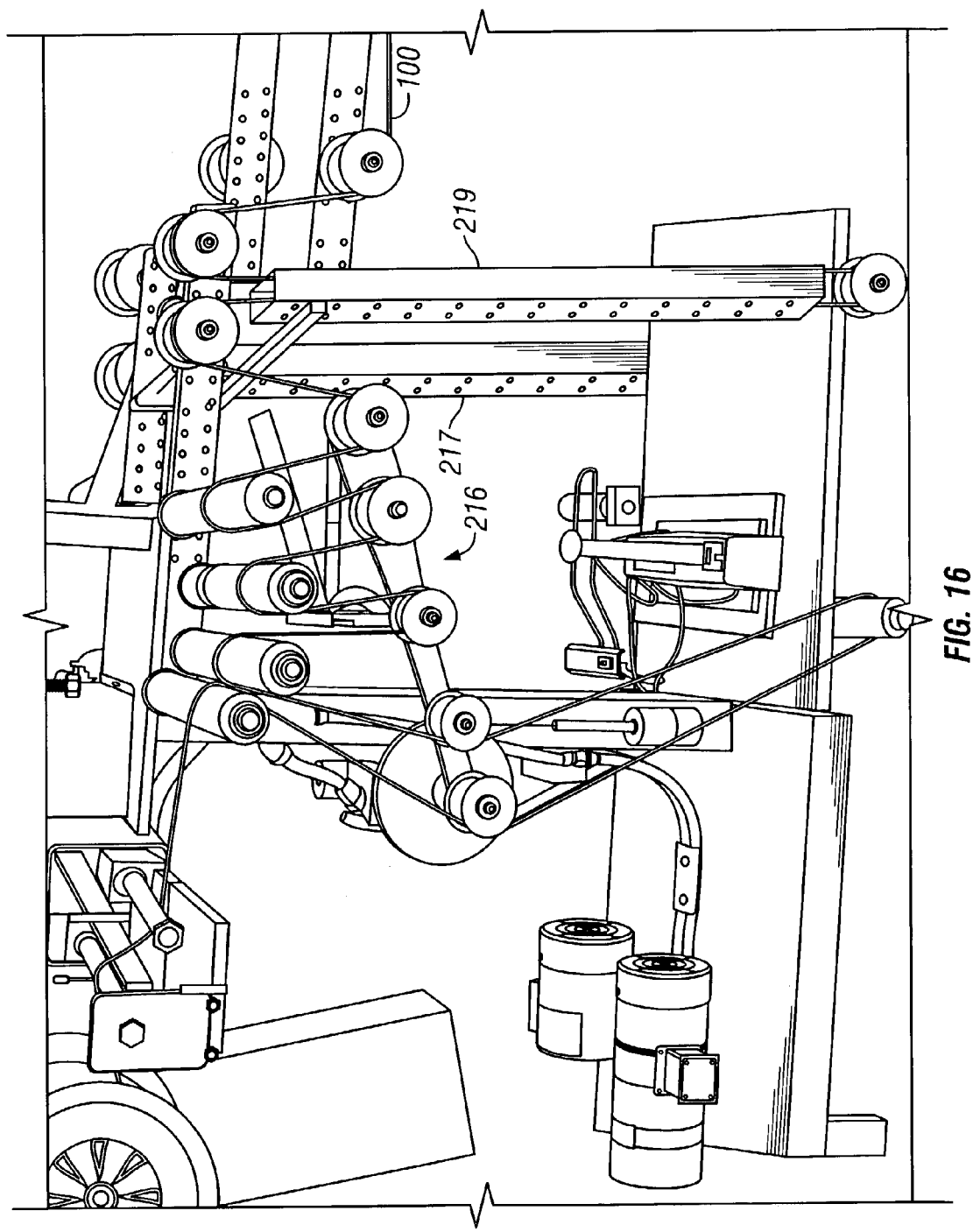
FIG. 16 is a perspective view of a tensioner of the present invention.
Figure 20:
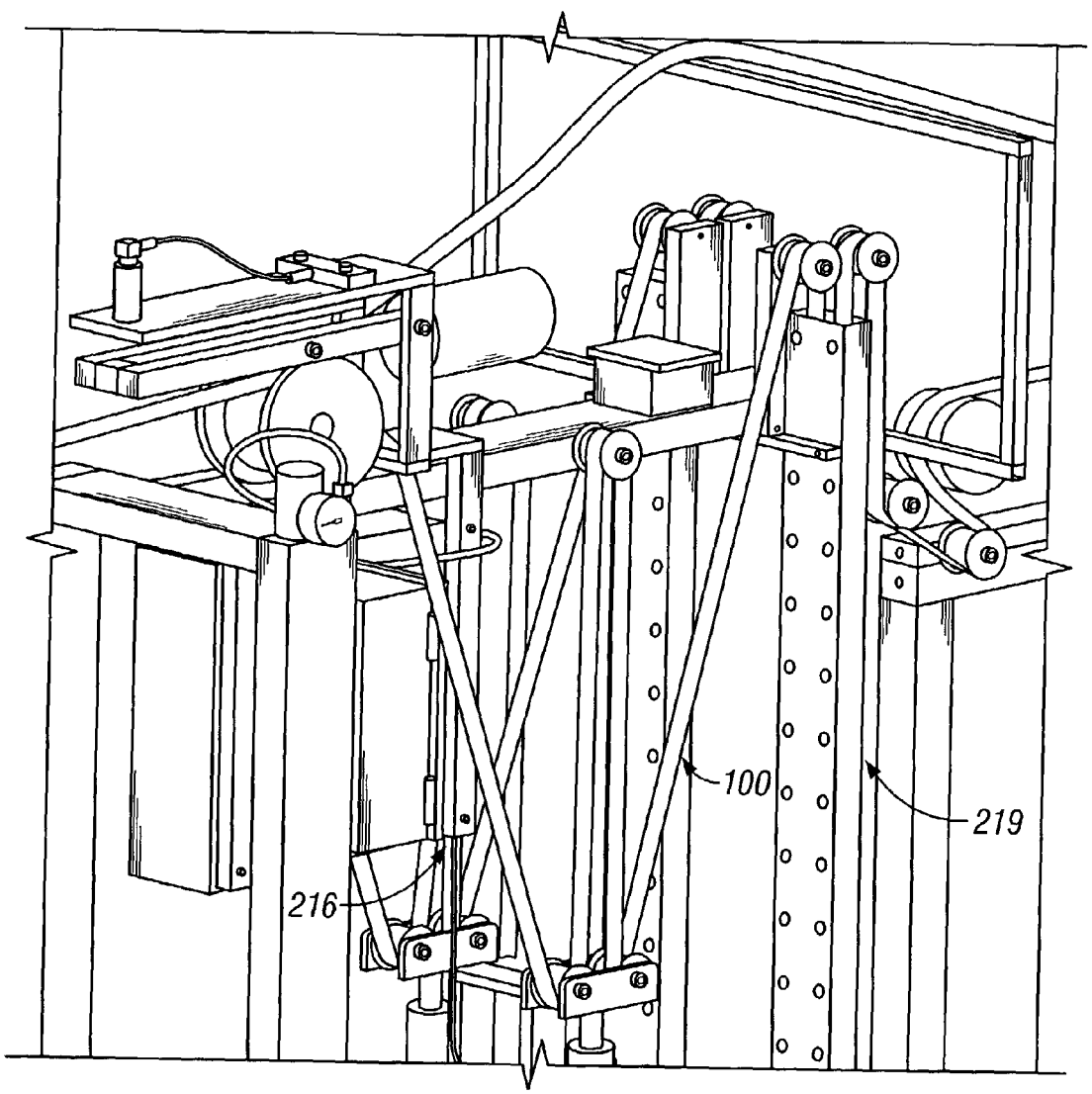
FIG. 20 is a perspective view of a tensioner of the present invention.

FIG. 9 depicts vibrator 220 as it initially impinges on fastener strip 100. At this time, the tension on fastener strip 100 is carefully controlled by a conventional tensioner. For example, dancer roller assembly 216 depicted in FIG. 16 is suitable for tensioning fastener strip 100. In addition, a tensioning fastener such as the one shown in FIG. 20 may also be used to control the tension and stretch of fastener strip 10. Additionally, as seen in FIGS. 16 and 20, fastener strip 100 has been preheated by means of preheaters 217 and 219 to a temperature greater than room temperature and less than the melting range or index of the thermoplastic material that composes fastener strip 100 so as to remove, curl, and facilitate molding, and which otherwise allows the saturation heating of fastener strip 100 to a prescribed temperature. As pneumatic assemblies 202 (best seen in FIG. 6) apply calibrated force to elevated anvil 230, the pressure that face 246 applies to fastener strip 100 and the distance between face 246 and face 236 are carefully controlled. Preferably, face 246 presses upon fastener strip 100 with a force of from 10 to 500 pounds per square inch, ideally about 70 pounds per square inch. Preferably, face 246 and face 236 are not permitted to touch.

Vibrator 220 vibrates a portion of fastener strip 100 so as to generate internal friction within fastener strip 100, causing a portion 212 of fastener strip to become relatively more malleable. The temperature of the vibrated portion often increases during the vibrating. The pressure exerted by first matrix 240 tends to displace some of the malleable portion in predictable directions. For example, the depth of transition volumes 251, 253 and the depth of groove 252 are calculated to displace a certain amount of the malleable portion along groove 252, and displace a certain amount of the malleable portion to or from the transition volumes 251, 253. Malleable material is also displaced transversely from the groove axis as first matrix 240 flattens the region between cutouts 248, 250. According to one embodiment, the malleable portion is secured to an adhesive surface member. For example, the malleable portion containing the first shape may be transported to the second matrix on the adhesive surface member. Additionally, the malleable portion containing tbe pressed shape may be transported to a cooler for solidifying the malleable portion while on the adhesive surface member. The malleable portion may then be released from the adhesive surface as a solidified portion.

First matrix 240 is properly shaped to press and extrude the displaced material in desired directions and, also, to mold and retain the displaced material at desired destinations. Preferably, the material displaced by first matrix 240 forms plug 160 or dam 180 of fastener strip 100 of the present invention; most preferably plug 160. The result is a product having first shape 242, depicted in FIG. 10, which significantly differs from the shape of prior art fastener strip 10.

Figure 10:
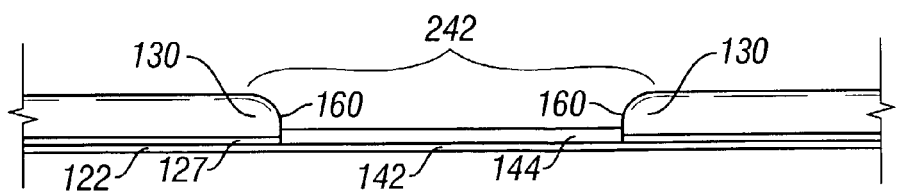
FIG. 10 is an elevation of the first shape, which is produced by the first stage.

Referring now to FIG. 10, first shape 242 includes flattened portion 142, elongated hump 144 and a curved portion abutting end 130 of reclosable portion 120. Hump 144 corresponds to the shape of groove 252. The curved portion corresponds to the shape of transition volumes 251, 253. First shape 242 facilitates sealing, and is sufficiently similar to the shape of fastener strip 100 so as to be reproducibly molded by vibrating and pressing in a single stage, as described above.

Figure 11:
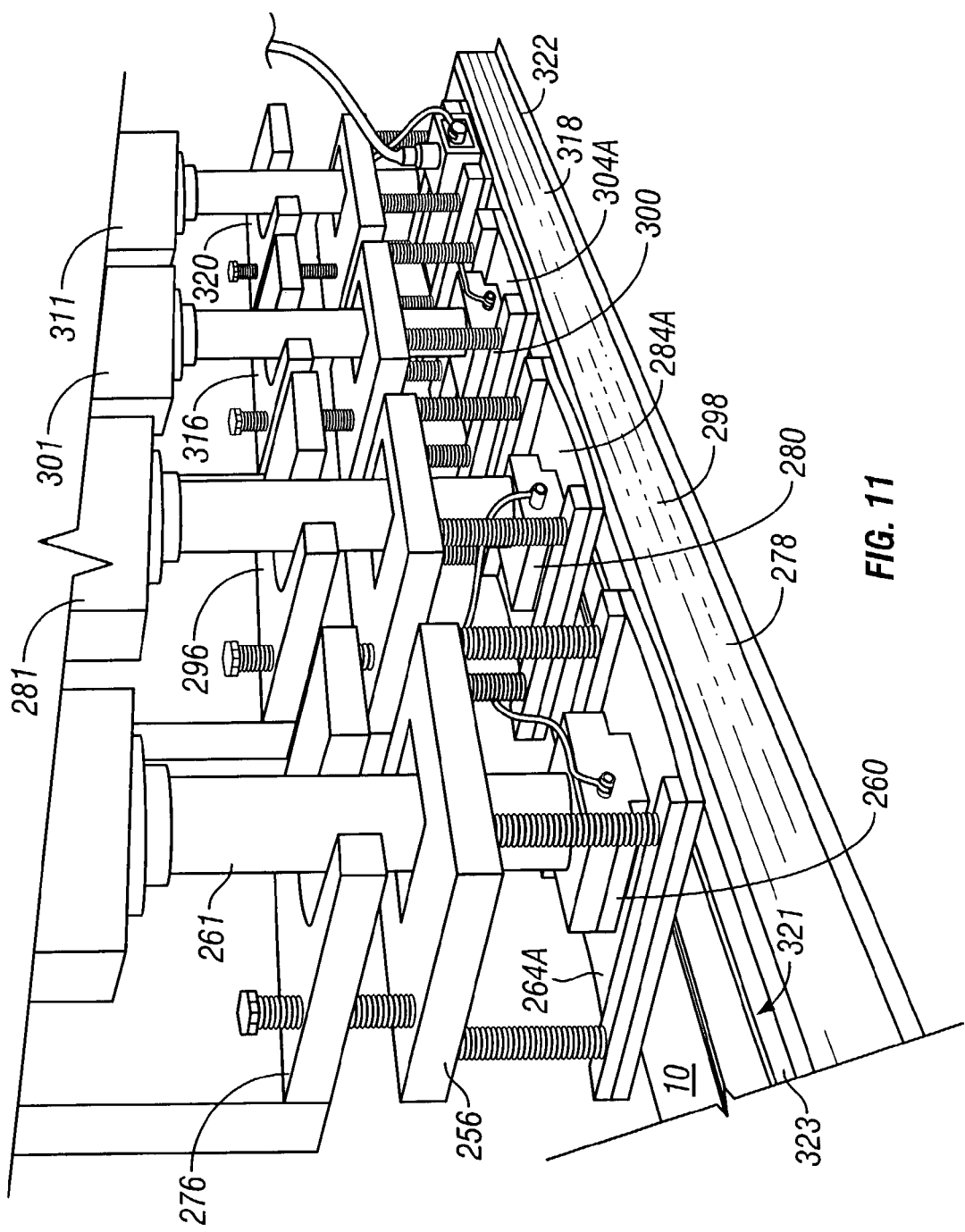
FIG. 11 is a perspective view of a second stage, a third stage, a fourth stage and a fifth stage of the apparatus depicted in FIG. 6.

FIG. 11 is a perspective view of second stage 276, third stage 296, fourth stage 316 and fifth stage 320 of apparatus 200. Each of these stages is located a short distance from each other at locations 278, 298, 318 and 322, respectively. Further, each stage is reinforced and rail mounted to permit length adjustments of fastener strip 100 segments. Each of these stages respectively has a dedicated pneumatic piston and cylinder assembly 261, 281, 301, 311 that forces a die down upon the fastener strip. Second stage 276, third stage 296, and fourth stage 316 are pressing stages that utilize matrices 260, 280, and 300. Alternatively, each matrix 260, 280 and 300 can be constructed as a separate die 260, 280 and 300. Each successive stage, from the second stage 276 through the fourth stage 316, provides over-stamping of the molten area of the fastener strip 100 to eliminate transition points and to provide a uniform sealing surface. The fifth stage 320 provides a final over-stamping and cooling of the fastener strip 100 to allow for the transportation of the fastener strip 100 segments without distortion.

As with first stage 256, the temperature, pressure, time and distance between die faces 266, 286, 306 and respectively associated anvils located underneath conveyor belt 321 are carefully controlled. In one embodiment such anvils are represented by a single base extending for a length underneath conveyor belt 321. Further, each such parameter or factor is separately controllable for each stage. The optimum combination of these factors depends on the precise nature of the fastener strip and the specifications of the finished seal portion. However, die temperatures of about 350 to about 400 degrees Fahrenheit and pressures of about 60 to about 80 pounds per square inch have been employed successfully in pressing stages 276, 296 and 316 with a pressing time of about half a second. Fifth stage 320 cools the finished product, which is fastener strip 100. Also shown in FIG. 11 is conveyor belt 321 which intermittently advances fastener strip 100. Conveyor belt 321 is preferably constructed of a ⅜ inch silicone blend to resist heat, but also has a surface 323 having a surface coating to trap and cause surface adhesion which sticks to or retains fastener strip 100 when it is heated sufficiently to be tacky. In one embodiment, the conveyor belt 321 is a coated rubber belt. The fastener strip 100 stays bonded to the conveyor belt 321 while the fastener strip 100 is in a molten state, maintaining registration and preventing elongation of the individual fastener step 100 segments. The fastener strip, when it is heated, is malleable-like taffy, but the tension on conveyor belt 321, and thereof fastener strip 100, is carefully controlled preferably by a servo motor (not shown), where the servo motor indexes the conveyor belt 321 to control the fastener step 100 segment length during processing. As a result, the fastener strip 100, as it travels along sticking to the conveyor belt 321, remains in its original size and configuration, except where it is shaped by die faces 266, 286 and 306. Upon cooling, the fastener strip 100 releases from the conveyor belt 321.

FIG. 12 shows die 260, which is typically utilized at second stage 276. Die 260 includes generally planar face 266 and a pair of oppositely located arcuate cutouts 268, 270, which are positioned with their convex sides facing each other. As compared to cutouts 248, 250 of first stage 256, cutouts 268, 270 are positioned closer together and have greater radii. As seen in FIG. 11, silicone coated stripper plate 264A is positioned between face 266 and fastener strip 100, to facilitate separation of face 266 from fastener strip 100 after compression. Consequently, only stripper plate 264A of die 260 touches first shape 242. Pressing die 260 against first shape 242 causes flattened portion 142 and hump 144 to become further flattened. Additionally, die 260 displaces material toward adjacent end 130, which ultimately forms dam 180. Preferably, plug 160 is not significantly affected by die 260.

The action of die 260 on first shape 242 produces second shape 262, which is depicted in FIG. 13. Flattened portion 146 is thinner, as compared to hump 144. Preferably, dam 180 is formed primarily by material displaced by die 260 and extends from backings 122 and 126 and partially surrounds plug 160.

Overall flatness of the finished fastener strip, such as fastener strip 100, is an important requirement for many fastening applications. Third stage 296 works with die 280, as depicted in FIG. 14, to generally flatten backings 122, 126 of fastener strip 100 and ensure that reclosable portion 120 and planar portion 140 are coplanar. Face 286 defines longitudinal channel 284, which is significantly deeper and wider than groove 252. Accordingly, die 280 has relatively little effect on plug 160 or dam 180. Third stage 296 produces third shape 282, which is similar to the shape of fastening strip 100. Again, a stripper plate 284A is utilized to facilitate separation after compression.

Figure 21:
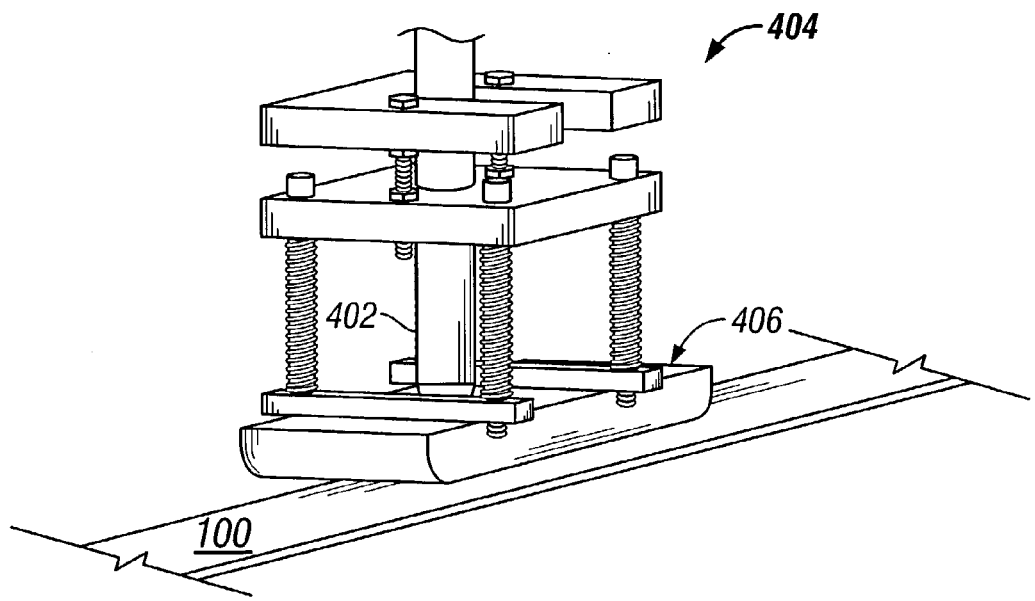
FIG. 21 is a perspective view of a temperature sensor of the present invention.

Fourth stage 316 works with die 300, as shown in FIG. 15. Die 300 has a generally planar face 306 with cutouts 308, 310 and is similar to die 262, except that cutouts 308, 310 are positioned closer together and have greater radii than cutouts 268, 270. When pressed against third shape 282 under proper conditions of pressure, temperature and spacing, die 300 completes planar portion 140 and produces fourth shape 302, which is the shape of fastener strip 100. Again, a stripper plate 304A is utilized to facilitate separation. Fifth stage 320 cools fastener strip 100 by reducing the temperature and allowing the molten fastener strip 100 to solidify so that it may be more conveniently transported and packaged. An example of such cooling is the pressing of a cooling member upon the fastener strip 100 resulting in the reduction in temperature of the fastener strip 100 by two hundred and fifty degrees Fahrenheit. Further, to achieve a reduction in temperature, a refrigeration unit is used to cool fluids that are passed through one or more components of the fifth stage 320 using thermostatically controlled valves. After the shaping of fastener strip 100 is completed, conveyor belt 321 advances the fastener strip to a second conveyor 101. As the fastener strip 100 travels, it continues to cool. As it cools, fastener strip 100 no longer adheres to belt 321, so it can be removed without stretching or distortion. Further, as shown in FIG. 21, an infrared non-contact temperature sensor 402, mounted in a temperature sensor assembly 404, the temperature assembly 404 located beyond the fifth state, may be used to monitor the exiting temperature of the fastener strip 100 to assure that the temperatures are lowered sufficiently to allow the fastener strip 100 segments to exit the conveyor belt 321 without elongation or distortion. As shown, the temperature sensor assembly 404, includes, along with other components, a temperature sensor 402 mounted vertically above fastener strip 100 and a spacer plate 406 with a hole 408 (not shown) aligned below the vertical path of sensor 402 to expose the fastener strip 100 there below. It is through hole 408 which the non-contact temperature sensor 402 measures the temperature of fastener strip 100. The lack of tension on fastener strip 100 is crucial to maintaining the dimensions and configuration of the fastener strip 100. Fastener strip 100 is then advanced by second conveyor 101 to a take up reel 103, again maintaining minimum tension and compression of the fastener strip 100.

The overall molding process is monitored and controlled using a computerized servo drive processor that is connected to the servo motor and six integrated temperature modules. The six integrated temperature modules are located at each of the five stages plus, as shown in FIG. 21, an additional module is used to monitor the exiting temperature. The servo drive processor is used to control the servo motor that moves conveyor belt 321. In addition, the servo drive processor is also used to control the following parameters at each stage: the temperatures of the matrix, die or other stage component that contacts the fastener strip 100; the length of time (dwell time) that pressure is applied to the fastener strip 100; the pressure applied to the fastener strip 100; and the speed at which any matrix, die or other stage component, engages fastener strip 100. In one embodiment, the temperature of any particular stage is controlled using a DLC controller by Omiron. In addition, the speed at which any particular stage engages the fastener strip 100 is controlled by a Yaskawa MP940 servo controller. Finally, the pressure which is applied to fastener strip 100 is controlled by a digital readout pressure gauge.

Figure 22:
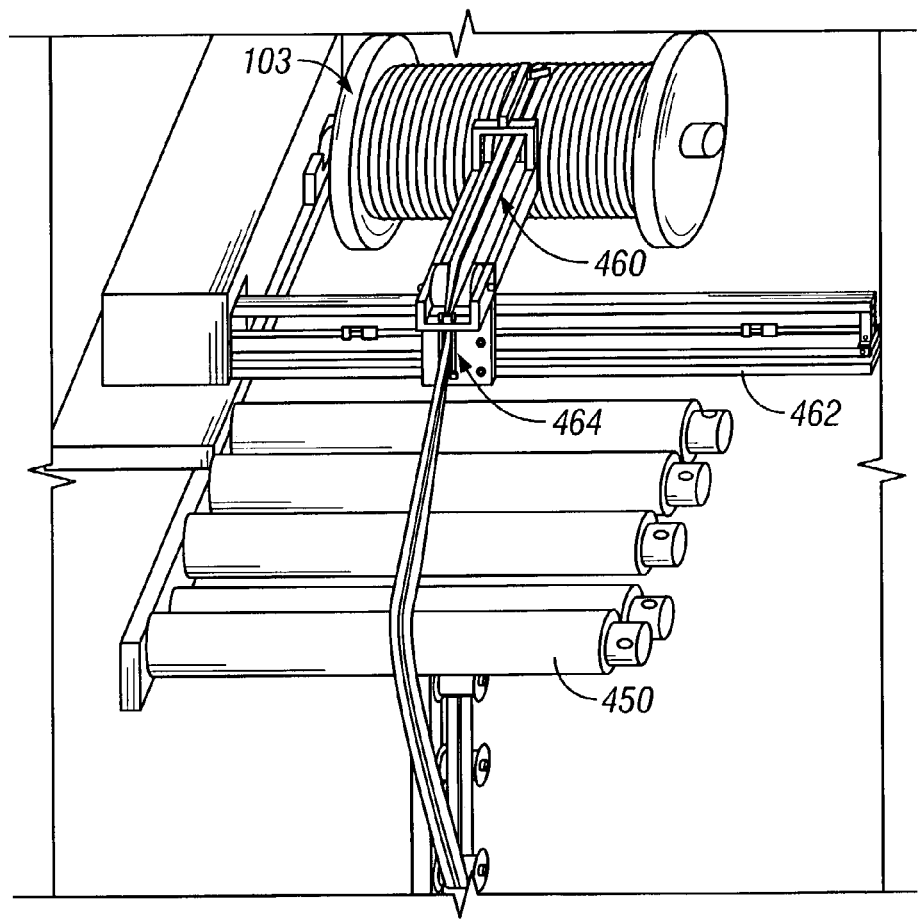
FIG. 22 is a perspective view of a rewind unit of the present invention.

As shown in FIG. 22, fastener strip 100 is fed over a pulley cylinder 450, through tension control dancer 460, to take up reel 103. Along this path fastener strip 100 is inverted through a vertical passage 464. Further, the tension control dancer 460 directs the fastener strip 100 back and forth about the width of take up reel 103 while at the same time preventing the stretching of the fastener strip 100. This back and forth movement results in an unstretched and generally even winding of the fastener strip 100 about take up reel 103. In addition, take up reel 103 is motor driven and its operation, along with tension control dancer 460, operate to maintain proper wind tension with the feedback loop. In the preferred embodiment the take up reel 103 holds 6,000 feet of fastener strip 100.

The invention also provides a method for sealing portions of a thermoplastic fastener strip, which process will now be described. The invention is not limited to the described process, starting materials, equipment or products.

A prior art fastener strip, such as fastener strip 10 is the starting material. A tensioning assembly, such as a dancer roller assembly 216 depicted in FIG. 16, is suitable for tensioning fastener strip 10. Dancer roller assembly 216 applies a precise tension to fastener strip 100, as will be appreciated and understood by practitioners. Fastener 100 is preheated by preheaters 217 and 219 to a temperature warmer than room temperature and cooler than the melting point or index of the thermoplastic material that composes fastener strip 100. For example, a temperature in the range of about 120° to about 130 degrees Fahrenheit is often useful. Control of temperature and tension prevents distortion of the fastener strip 100. Fastener strip 100 is then advanced by conveyor belt 321.

A portion of fastener strip 100 is vibrated between a vibrator and an anvil at a first stage. The vibrating is effective to increase the malleability of the portion, as compared to the malleability of fastener strip 100 before vibrating. A first matrix is pressed against the malleable portion to produce a first shape. The pressing may be carried out simultaneously with the vibrating. Second matrix 260, third 280 and fourth matrices 300 are subsequently pressed against the malleable portion to produce a second shape, a third shape and a fourth shape, respectively. Each pressing is accomplished in a separate stage at a different location. The fastener strip may be heated before or during the stages. The finished fastener strip is cooled to room temperature and may then be wound on a spindle or roll for later use by the bag converter, again at a precise tension to avoid distortion.

The vibrator oscillates in contact with the fastener strip at a frequency of about 10,000 to about 100,000 cycles per second, preferably at least about 20,000 cycles per second. As described above, the vibrator includes an actuator, a resonator or horn, and a first matrix, which is unitary with the horn. The vibrator is positioned over the fastener strip and an anvil is positioned under and in contact with the fastener strip. Preferably, the vibrator does not touch the anvil. Alternatively, two or more vibrators may be brought into contact with the fastener strip with the fastener strip positioned between the vibrators.

While only a few, preferred embodiments and aspects of the invention have been described above, those of ordinary skill in the art will recognize that these embodiments and aspects may be modified and altered without departing from the central spirit and scope of the invention. Thus, the preferred embodiments and aspects described above are to be considered in all respects as illustrative and no restrictive, the scope of the invention being indicated by the appended claims, rather than by the foregoing description, and all changes which come within the meaning and range of equivalency of the claims are intended to be embraced herein.

We claim:

1. A method for sealing portions of a thermoplastic fastener strip, which method comprises the steps of:
   providing a thermoplastic fastener strip;
   vibrating a portion of the fastener strip so as to increase the malleability of said portion, as compared to the malleability of the fastener strip before vibrating;
   pressing a first matrix at a first location against the malleable portion to produce a first shape;
   transferring the malleable portion to a second location juxtaposed to the first location while the malleable portion is still malleable;
   pressing a second matrix at the second location against the malleable portion while the portion is still malleable to produce a second shape, thereby enhancing the first shape, and wherein an essentially airtight dam is formed; and
   cooling the malleable portion to transform the malleable portion.

2. The method of claim 1 in which the first matrix is pressed against the malleable portion of the fastener strip with a force between 10 and 500 pounds per square inch.

3. The method of claim 1 in which the second matrix is greater than 350 and equal to or less than 400 degrees Fahrenheit.

4. The method of claim 1 in which the second matrix is pressed against the malleable portion of the fastener strip with a force between 60 and 80 pounds per square inch.

5. The method of claim 1 in which the cooling reduces the temperature of the malleable portion by 250 degrees Fahrenheit.

6. The method of claim 1 in which the second matrix presses for a period of between 0.3 and 0.7 seconds.

7. The method of claim 1 in which the second matrix presses for 0.5 seconds.

8. The method of claim 1 which includes the sensing of the exiting temperature of the fastener strip.

9. A method for sealing portions of a thermoplastic fastener strip, which method comprises the steps of:
provic a thermoplastic fastener strip;
vibrating a portion of the fastener strip so as to increase the malleability of said portion, as compared to the malleability of the fastener strip before vibrating;
securing the malleable portion to an adhesive surface member;
pressing a first matrix against the malleable portion to produce a first shape; and
pressing a second matrix against the malleable portion to produce a second shape, thereby enhancing the first shape, and wherein an essentially airtight dam is formed.

10. The method of claim 9 which includes releasing from the adhesive surface the formerly malleable portion as a solidified portion.

11. The method of claim 9 in which securing the malleable portion includes maintaining registration and preventing elongation thereof.

12. The method of claim 9 which includes transporting the malleable portion containing the first shape to the second matrix on the adhesive surface member.

13. The method of claim 9 which includes transporting the malleable portion containing a pressed shape to a cooler for solidifying the malleable portion on the adhesive surface member.

14. A method for sealing portions of a thermoplastic fastener strip, which method comprises the steps of:
providing a thermoplastic fastener strip;
vibrating a portion of the fastener strip so as to increase the malleability of said portion, as compared to the malleability of the fastener strip before vibrating;
pressing a first matrix at a first location, having a temperature control, against the malleable portion to produce a first shape;
pressing a second matrix, having a temperature control, against the malleable portion to produce a second shape, transferring the malleable portion into a second location juxtaposed to the first location while the malleable portion is still malleable, thereby enhancing the first shape, and wherein an essentially airtight dam is formed;
sensing an operating temperature at the first matrix;
sensing an operating temperature at the second matrix at a second location; and
cooling the malleable portion to transform the malleable portion while the portion is still malleable.

15. The method of claim 14 in which one of the operating temperatures is sent to a computerized controller, and in response, the computerized controller sends temperature control signals to adjust the associated operating temperature.

16. The method of claim 14 in which one of the operating temperatures is sent to a computerized controller, and in response, the computerized controller sends a movement command to a servo which moves a conveyor belt.

17. The method of claim 1 wherein at least one of the first matrix and the second matrix further includes arcuate cutouts.

18. The method of claim 17 wherein at least one of the first matrix and the second matrix includes a groove.

* * * * *